United States Patent [19]
Clausen et al.

[11] Patent Number: 5,448,405
[45] Date of Patent: Sep. 5, 1995

[54] GLARE FILTER

[75] Inventors: Eivind Clausen; James D. Allsop; Michael W. Yeakel, all of Bellingham; LeRoy J. LaCelle, Renton; Theodore F. Pierson, Seattle, all of Wash.

[73] Assignee: Allsop, Inc., Bellingham, Wash.

[21] Appl. No.: 242,554

[22] Filed: May 13, 1994

[51] Int. Cl.⁶ ............................................. G02B 27/00
[52] U.S. Cl. ..................................... 359/601; 359/609; 359/611; 361/220
[58] Field of Search ............... 348/834, 842; 359/601, 359/604, 609, 612, 611, 613; 248/205; 361/220

[56] References Cited

U.S. PATENT DOCUMENTS

| | | | |
|---|---|---|---|
| 4,633,322 | 12/1986 | Fourny | 348/834 |
| 4,745,518 | 9/1988 | Fang | 361/220 |
| 4,834,330 | 5/1989 | Swillinger | 248/205 |
| 4,863,242 | 9/1989 | Correa | 359/601 |
| 4,864,190 | 9/1989 | Orr | 313/478 |
| 4,974,935 | 12/1990 | Lee | 49/99 |
| 5,004,320 | 4/1991 | Nagai et al. | 359/601 |
| 5,101,298 | 3/1992 | Lentz et al. | 359/612 |
| 5,155,627 | 10/1992 | Keehn et al. | 359/609 |
| 5,227,916 | 9/1994 | Theirl et al. | 359/609 |
| 5,320,318 | 9/1994 | Chen | 359/609 |

Primary Examiner—Loha Ben
Assistant Examiner—Mohammad Sikder
Attorney, Agent, or Firm—Christensen, O'Connor, Johnson & Kindness

[57] ABSTRACT

A glare filter for use with a visual display terminal having a display screen on its forward side is disclosed. The glare filter includes a filter screen, a mount, and couplings. The filter screen has lateral edges, a top edge, and a bottom edge. A mount is secured to the terminal and includes two lateral guides that form channels. The distance between the channels is slightly larger than the width of the filter screen to slidably receive the lateral edges of the filter screen. The channels are oriented generally transverse to the surface of the display screen, such that the filter screen may be held above the terminal and above the display screen. The couplings extend from the filter screen and slidably and pivotally engage within the channels of the lateral guides. The couplings are pivotally movable relative to the mount when the filter screen is extended to a forwardmost position relative to the mount. This allows the filter screen to be pivoted downwardly to a position overlying the display screen. An antistatic grounding system also dissipates electrostatic energy through the couplings and a drain wire.

16 Claims, 6 Drawing Sheets

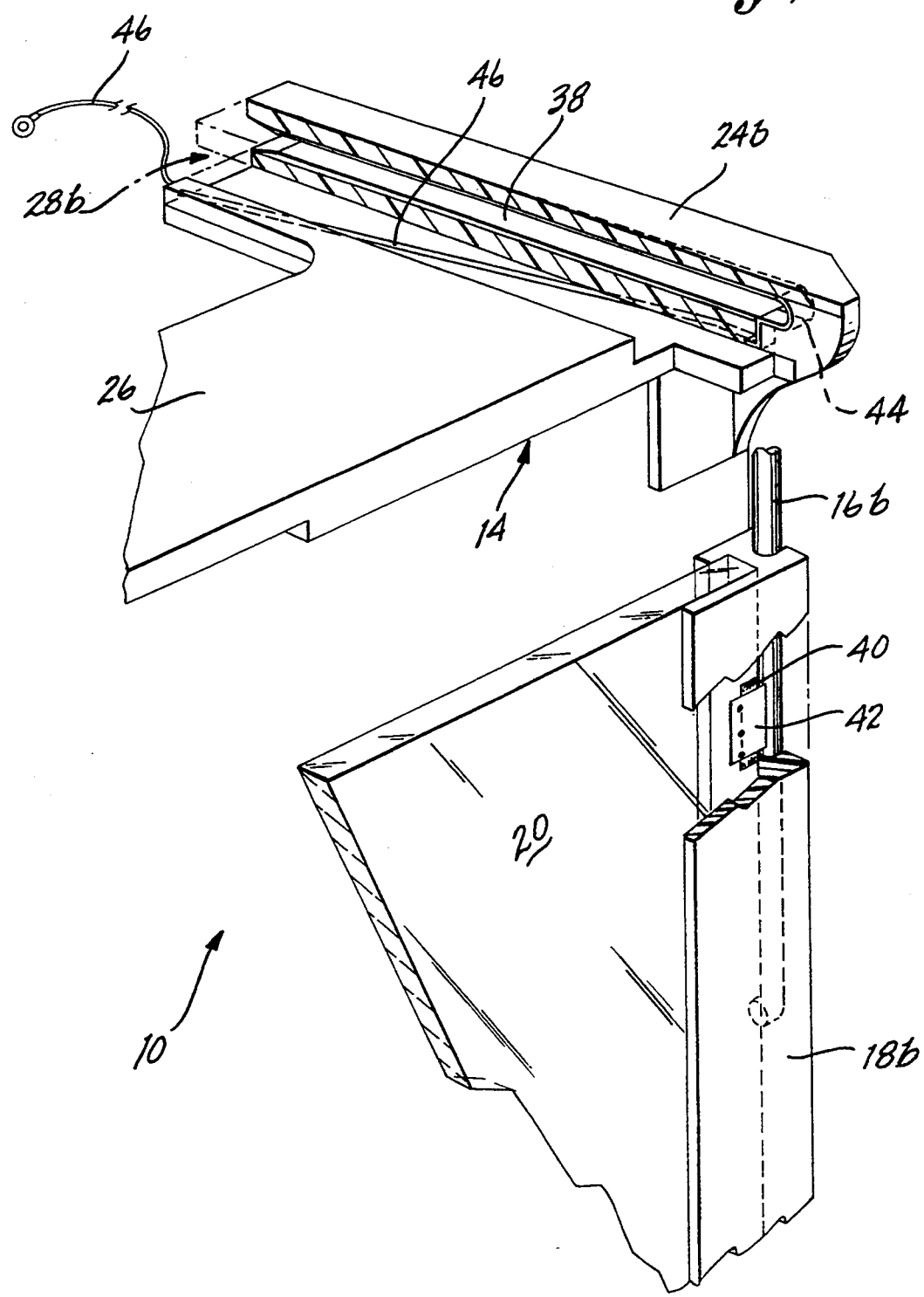

GLARE FILTER

FIELD OF THE INVENTION

This invention relates to computer and electronics accessories, and, more particularly, to antiglare screens for computer monitors and other illuminated video display terminals.

BACKGROUND OF THE INVENTION

Widespread use of viewing screens, such as personal computer monitors, word processors, and other instruments or devices with display panels, has prompted attempts to reduce eyestrain problems associated with prolonged use of such visual display screens. Eyestrain problems frequently occur due to glare or reflection of light sources, poor contrast and clarity, or E-field radiation. Such problems can result in blurred vision, visual fatigue, and headaches. Problems also occur due to buildup of static electricity and, thereby, dust.

Some have attempted to solve the glare problems by making overlay screens that are secured over the face of the display. Screens have been constructed of coated glass, plastic, and netting. These screens have not been easy to remove and clean, since they are directly attached to the display. Also, most such screens cannot be conveniently moved from in front of the display when lighting conditions change. Such change may occur every day if, for example, sunlight shines into the room in which the display is used. During evening hours ambient light may be lower and supplied only from overhead fixtures, while during midday strong light may enter through a window.

Visors have also been developed to shade the display from overhead light sources and, thereby, reduce reflection and glare. However, most visors have been bulky and/or difficult to adjust or remove when not needed or wanted. The visors also do not provide direct screening over the display when needed.

The glare filter of the present invention was developed to safely and securely position a filter screen in place (1) directly in front of the display, (2) above the display in a hood position to eliminate glare and reflection from overhead sources and during low light conditions, or (3) directly above the terminal and out of the way when not needed or for cleaning of the display surface. The filter screen is also easily removed from its mount for easy cleaning of its surfaces.

SUMMARY OF THE INVENTION

A glare filter for use with a visual display terminal having a display screen is provided. The glare filter includes a filter screen, a mount, and a coupler. The filter screen is positionable over the display screen to reduce display screen glare. The mount is secured to the terminal. The coupler extends from the filter screen and is pivotally and slidably attached to the mount. In this manner, the mount allows the filter screen to be moved from a position over the display screen to a position removed from the display screen. The mount preferably includes a guide positioned to slidably receive the coupler.

The guide preferably includes a channel within which an end of the coupler pivots to position the filter screen over the display screen of the glare filter. The coupler also slides to position the filter screen adjacent the terminal away from the display screen. In this embodiment, the mount is secured to the top of the terminal and the channel extends in a direction generally transverse to the display screen surface.

More particularly, the filter screen includes lateral edges, a top edge, and a bottom edge. The mount is secured to the terminal and includes two lateral guides that form channels. The distance between the channels is slightly larger than the width of the filter screen to slidably receive the lateral edges of the filter screen. The channels are oriented generally transverse to the surface of the display screen such that the filter screen may be held above the terminal or above the display screen. Couplings extend from the filter screen and slidably and pivotally engage within the channels of the lateral guides. The couplings are pivotally movable relative to the mount when the filter screen is extended to a forwardmost position relative to the mount to allow the filter screen to be pivoted downwardly to a position over the display screen. Preferably, the lateral edges of the filter screen include lateral supports. The couplings are connected to these lateral supports and the lateral supports are slidably engageable within the channels of the lateral guides.

The lateral supports also include adjustment holes extending transversely into the lateral supports. The longitudinal axis of the couplings is parallel to the lateral edges of the filter screen and the bottom end of each coupling includes an inward projection that removably mates with one of the adjustment poles for vertical adjustment of the filter screen.

Also in the preferred embodiment of the invention, the couplings include top ends, bottom ends, and outward projections at their top ends. The lateral guides include inner slots within the channels to receive the outward projections of the couplings. These inner slots terminate before the forwardmost ends of the lateral guides to limit forward sliding movement of the filter screen. The filter screen is pivotally movable in a downward direction about said outward projections when the filter screen is slid to a forwardmost position with the lateral edges forward of the channels of the lateral guides.

In one preferred embodiment of the invention, at least one of the couplings is made of an electrically conductive material. That coupling is in contact with one of the lateral edges of the filter screen and the upper end of that coupling is coupled to a grounding wire when the filter screen is in a lowered position covering the display screen. The filter screen includes a conductive layer that is connected to the coupling at the lateral edge of the filter screen.

The filter screen is preferably constructed of a low-transmission glass but may alternatively be constructed of other materials that reduce glare.

The advantages to the embodiments of the invention discussed above are numerous. The glare filter is effective against glare and static, reducing eyestrain and visual fatigue; at the same time it increases productivity. The glare screen also enhances contrast and clarity. Dust buildup is effectively reduced by dissipating electrostatic energy from the glass through the connecting rod and through a drain wire out the back of the unit. The mounting system safely and securely positions the glare filter in place for use over the display screen, above the display screen to act as a hood, or completely out of the way when not required or for cleaning of both the glare screen surfaces and the display screen of the terminal. The glare filter of the present invention also requires little extra space above the monitor or other terminal when not in use as a hood or over the display screen. The couplings provide for adjustability on a vertical axis in order to match all varieties of monitors.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 is a cutaway view showing the antistatic grounding features of the glare filter of the present invention.

DETAILED DESCRIPTION OF THE PREFERRED EMBODIMENT

Figure 1:
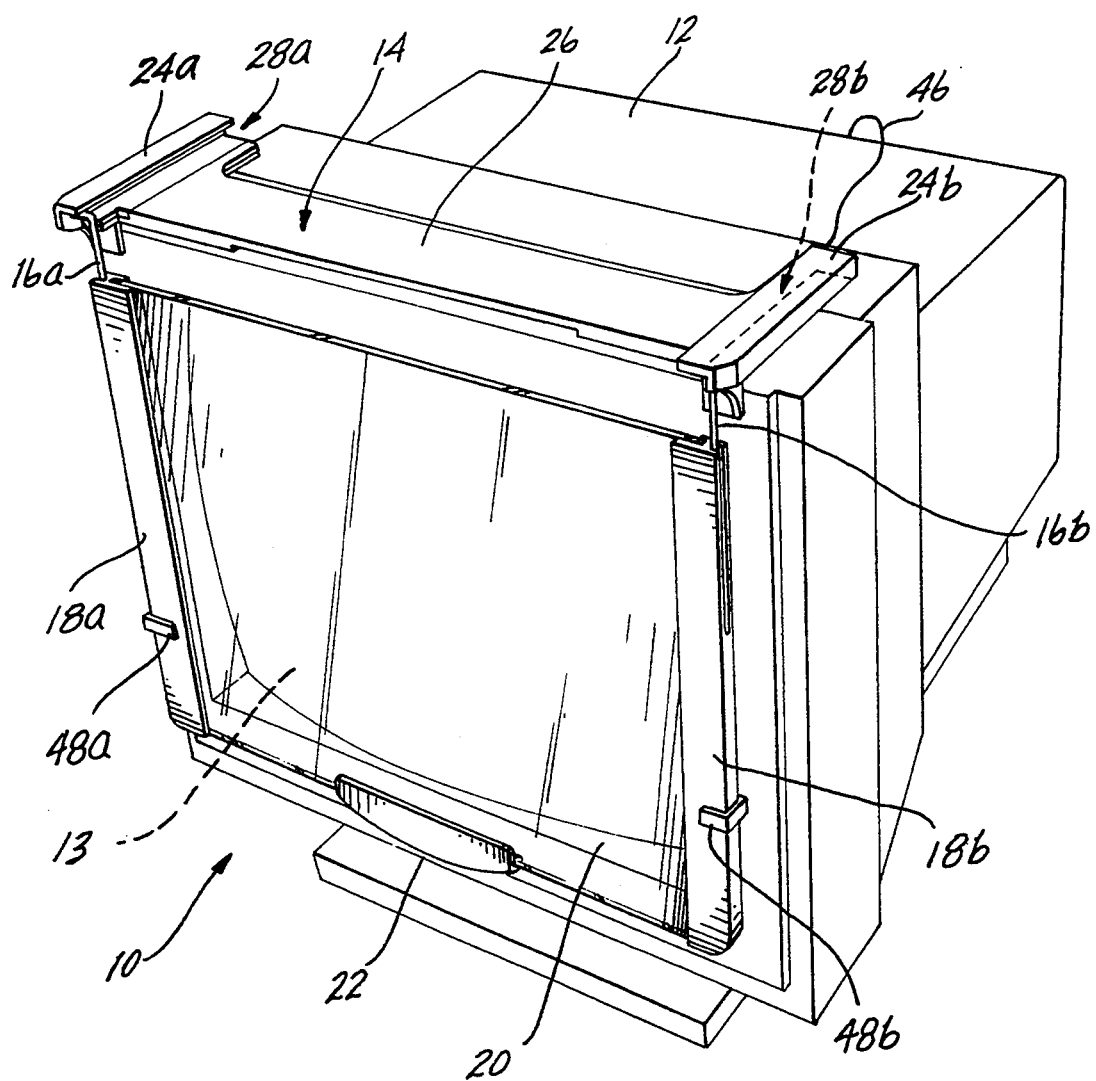
FIG. 1 is a perspective view of the glare filter of the present invention, shown attached to a computer monitor.

Referring to FIG. 1, the preferred embodiment of a glare filter 10 of the present invention will be described in relation to a computer monitor 12 within an associated video display 13. Glare filter 10 in the preferred embodiment is used with a video display terminal such as that of a computer monitor. However, it will be appreciated that the glare filter could also be used with other video display terminals. Monitor 12, illustrated in FIG. 1, is a standard monitor having top, sides, base, and video display 13 on its forward face. Glare filter 10 includes a top mount 14, rods 16, lateral supports 18, filter glass 20, and handle 22.

Throughout this description, like plural elements will be referred to by a single reference number, e.g., rods 16. When one particular element of the plurality is referred to, a lowercase letter will be used with the number, e.g., rod 16a.

Top mount 14 is secured to the top of monitor 12 to hold filter glass 20 in any one of multiple positions to be described below. Top mount 14 includes a symmetrically opposed pair of lateral guides 24 separated and interconnected by a guide spacer 26. Guide spacer 26 is generally rectangular and flat. Guide spacer 26 preferably includes a reduced thickness in its center section to reduce material costs. This reduced section also allows space for the use of other attachments. The bottom surfaces of guide spacer 26 preferably include an attachment medium to secure top mount 14 to the top of monitor 12. Velcro, tape, or other fastening means may be used as the attachment medium to secure top mount 14 securely to the top of monitor 12. At the outside ends of guide spacer 26, lateral guides 24 extend parallel to one another in directions perpendicular to filter glass 20. Lateral guides 24 are also generally parallel to the top surface of monitor 12 to which guide spacer 26 is attached. Lateral guides 24 have inwardly opening C-shaped cross sections to form lateral channels 28 within which both rods 16 and lateral supports 18 ride, as explained below. Top mount 14 also includes mount projections 36 that extend beneath the forward ends of lateral guides 24. Mount projections 36 facilitate the accurate placement of top mount 14 on monitor 12, since the projections extend downwardly to contact a forward face of monitor 12. This arrangement ensures that filter glass 20 may be pivoted downwardly over video display 13 without interfering with the front of monitor 12. Mount projections 36 also act as support braces against monitor 12 to hold filter glass 20 over video display 13. Entire top mount 14 is preferably constructed of injection-molded plastic.

Filter glass 20 is generally rectangular in shape and is slightly larger than video display 13 of monitor 12. Preferably, filter glass 20 is a low-transmission glass to eliminate reflections from the monitor surface and improve the clarity of text and graphics being displayed. A nonglare coating is permanently bonded to the surface of the glass as is a layer of conductive material for antistatic purposes, which are described below in conjunction with FIG. 7. Filter glass 20 reduces blurred vision, eyestrain, visual fatigue, and headaches caused by glare. Alternatively, filter material other than glass may be used. Plastic or net screening are examples of potential alternatives.

Filter glass 20 is coupled to top mount 14 through the use of lateral supports 18 and rods 16. Rods 16 are slidably and pivotally coupled to top mount 14 and are connected to lateral supports 18. Lateral supports 18 extend along the sides of filter glass 20 to provide connection between rods 16 and filter glass 20. Alternatively, lateral supports 18 may extend only just below rod channel 32 and not the entire length of the lateral edge of filter glass 20. Lateral supports 18 include bumpers 48 removably secured near the lower end of the supports. Further details of bumpers 48 will be discussed below in conjunction with FIGS. 2 and 4. Handle 22 is secured to the lower edge of filter glass 20 to enable easy handling of filter glass 20.

Rods 16 are generally Z-shaped with a long central straight portion and two short end portions bent 90 degrees from the central portion. The upper end portions extend outwardly to engage within lateral channels 28. The lower end portions extend inwardly to engage within lateral supports 18. Most of the central portions of rods 16 are also engaged within the outer sides of lateral supports 18. Each of lateral supports 18 includes a rod channel 32 extending longitudinally along the outer sides of lateral supports 18 from the tops to approximately one third to one half the length of lateral guides 18. Rod channels 32 are C-shaped in cross section, having a smaller width near the outer sides of lateral supports 18 than within the main body of rod channels 32. The widest portion of rod channels 32 is approximately the same diameter as that of rods 16, such that rods 16 are snapped into place and securely held by rod channels 32 until adjustment is desired, as described below. Lateral supports 18 are also provided with inward channels 30 on their inner sides within which filter glass 20 is engaged and fixedly secured. Inward channels 30 have approximately the same width as the thickness of filter glass 20 for close engagement therewith and extend almost the entire length of lateral supports 18. Inward channels 30 do not extend through the bottom of lateral supports 18, such that filter glass 20 is securely surrounded by lateral supports 18.

Figure 2:
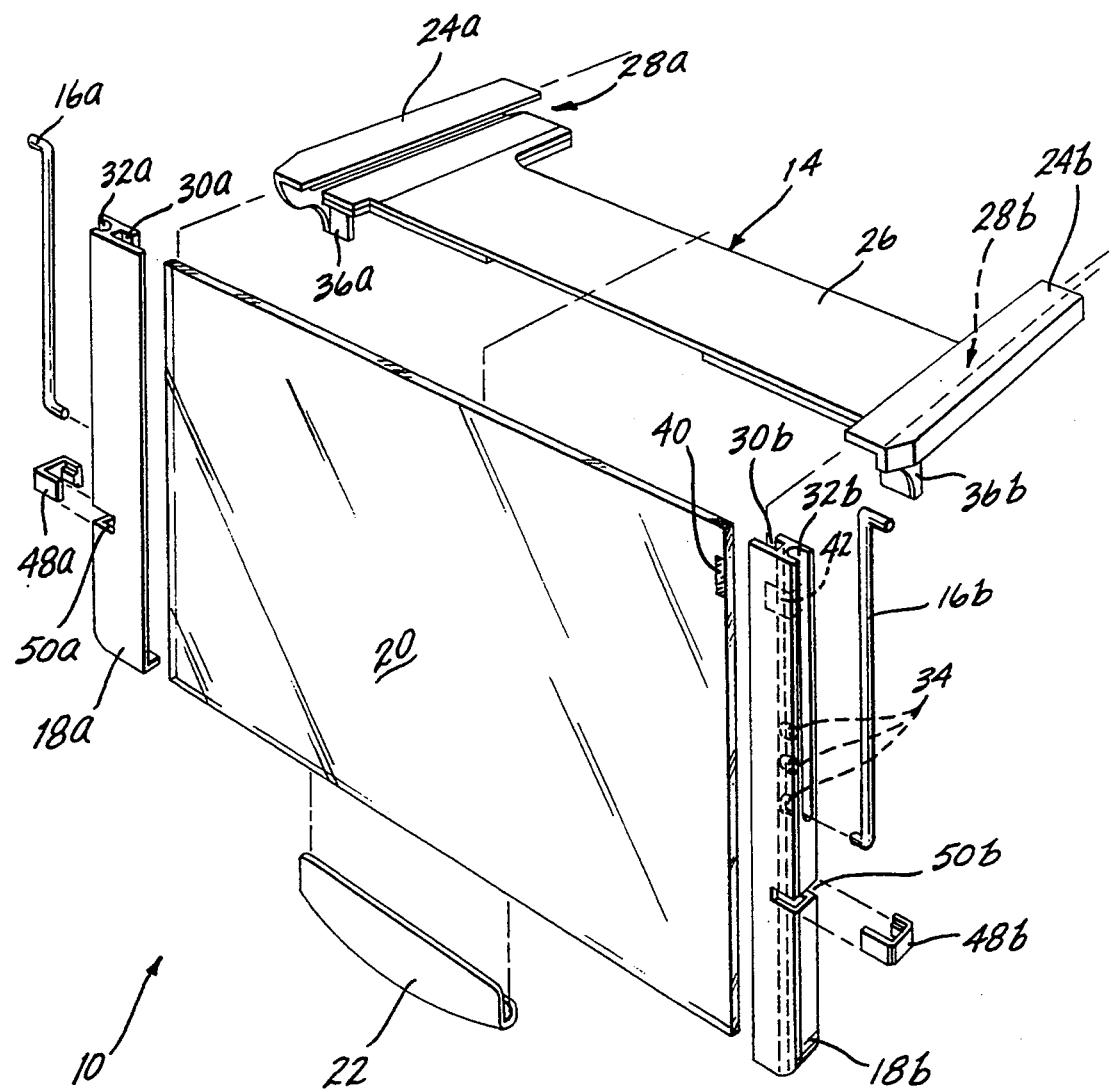
FIG. 2 is an exploded perspective view of the glare filter showing the component parts.

The components of glare filter 10 referred to above will be described in more detail in conjunction with FIG. 2. As discussed above, top mount 14 is made up of lateral guides 24 and guide spacer 26. Guide spacer 26 spans essentially the width of filter glass 20 and positions lateral guides 24 opposite one another in a symmetric fashion to hold both rods 16 and lateral supports 18. Lateral supports 18 are preferably constructed of injection-molded plastic material.

The vertical positioning of filter glass 20 over video display 13 can be effected by repositioning rods 16 within lateral supports 18. The removable engagement of rods 16 within rod channels 32, as well as the provision of adjustment holes 34 into which the lower ends of rods 16 may be secured, allows for multiple, secure positions. Adjustment holes 34 extend inwardly, perpendicular to rod channels 32. The diameter of adjustment holes 34 is approximately the same as that of rods 16, such that the ends of rods 16 will easily fit within them. Preferably, three adjustment holes are provided in each of lateral supports 18 at equal vertical locations along lateral supports 18. Therefore, a larger distance between the top surface of monitor 12 and video display 13 can be accommodated by moving rods 16 to upper adjustment holes 34.

Handle 22 is also constructed of injection-molded plastic. Handle 22 is secured centrally to the bottom edge of filter glass 20 and covers, in the preferred embodiment, approximately a third of the bottom edge of filter glass 20. Handle 22 is U-shaped in cross section with a slot to receive filter glass 20. An adhesive or adhesive tape may be applied within the slot of handle 22 for fixedly attaching it to filter glass 20.

Notches 50 are provided near the lower ends of lateral supports 18 for removably receiving bumpers 48. Notches 50 are formed by rectangular recessed regions across the outside edges and partially across the front and rear faces of lateral supports 18. Bumpers 48 have complementary U shapes with inner projections that fit within notches 50 and wider outer portions that project away from the sides of lateral supports 18. As will be explained below in conjunction with FIG. 4, bumpers 48 limit the rearward movement of lateral supports 18 within lateral channels 28.

Figure 3:
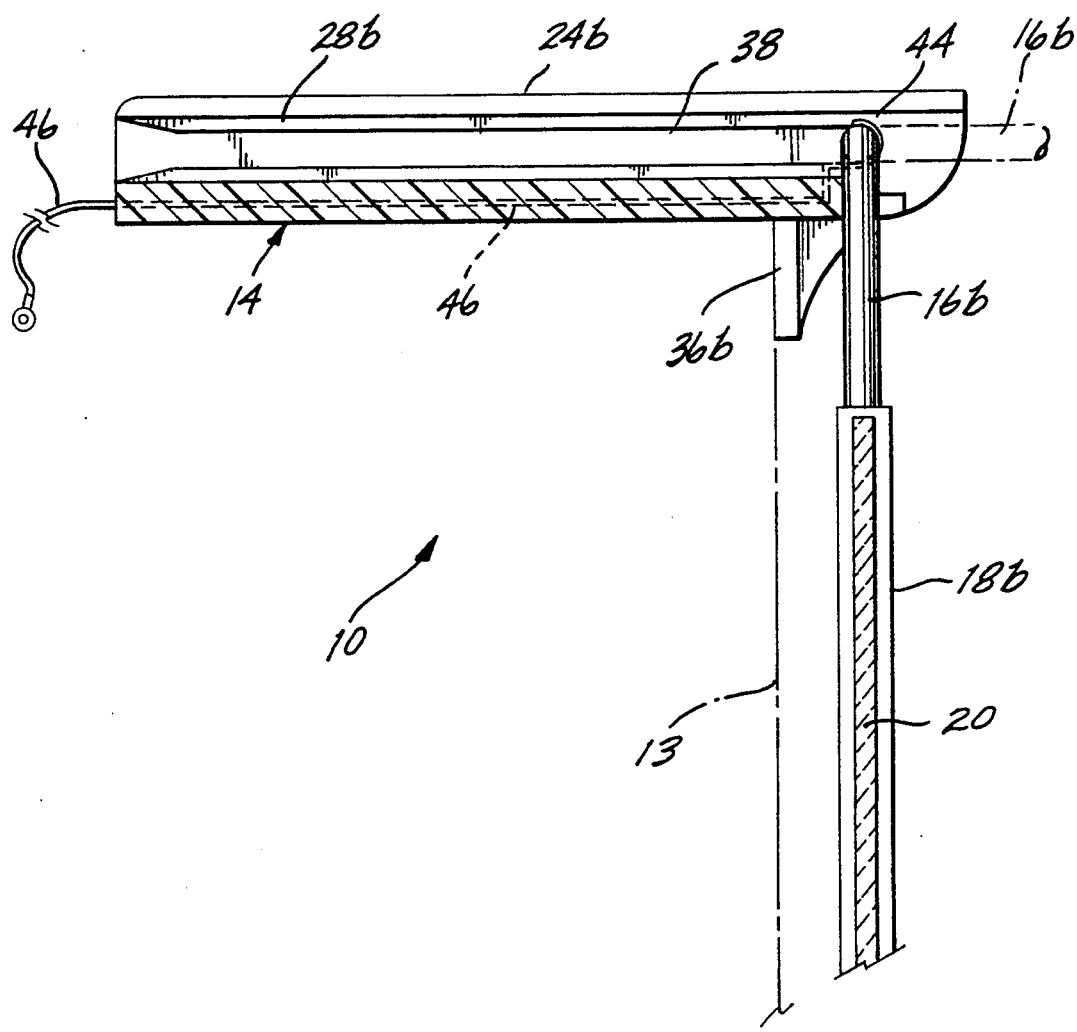
FIG. 3 is a cross-sectional view showing the sliding and pivoting action of the filter glass relative to the top mount.

Referring now to FIG. 3, the sliding and pivoting arrangement of rods 16 and lateral supports 18 within lateral guides 24 will now be discussed. Slots 38 are formed within lateral channels 28, discussed above. Slots 38 have a width only slightly larger than the diameter of rods 16, such that the outwardly extending upper ends of rods 16 may slide therein. Slots 38 extend from the rearward edges of lateral guides 24 up to and past guide spacer 26 and mount projections 36. However, slots 38 stop before the front edges of lateral guides 24, such that the extension or movement of rods 16 is limited to secure filter glass 20 without danger of separation in a forward direction from top mount 14. Slots 38 run centrally within and parallel to lateral channels 28. The rearward ends of slots 38 are open such that the upper ends of rods 16 may slide completely out of lateral guides 24 with the lateral supports 18 being held by lateral channels 28.

Figure 4:
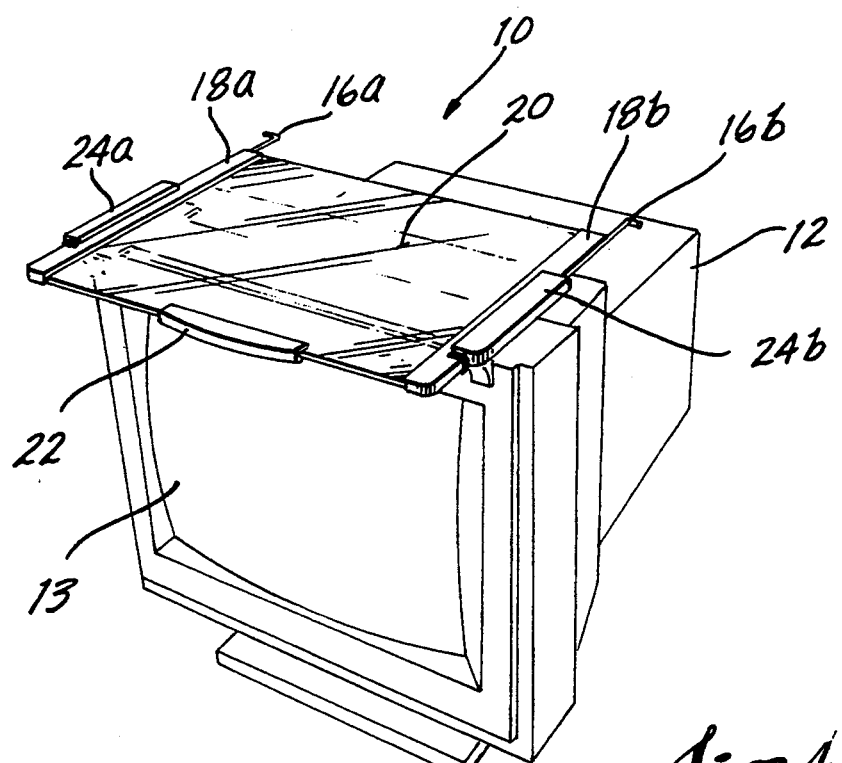
FIG. 4 is a perspective view showing the filter glass in a position above the monitor.
Figure 5:
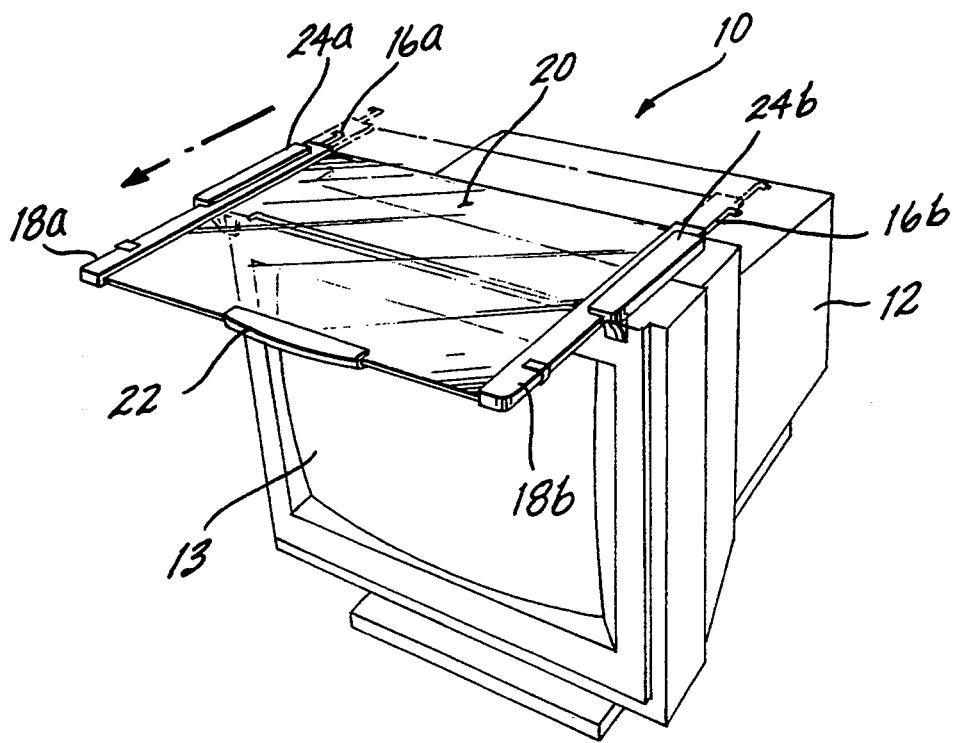
FIG. 5 is a perspective view showing the filter glass in a hood position.
Figure 6:
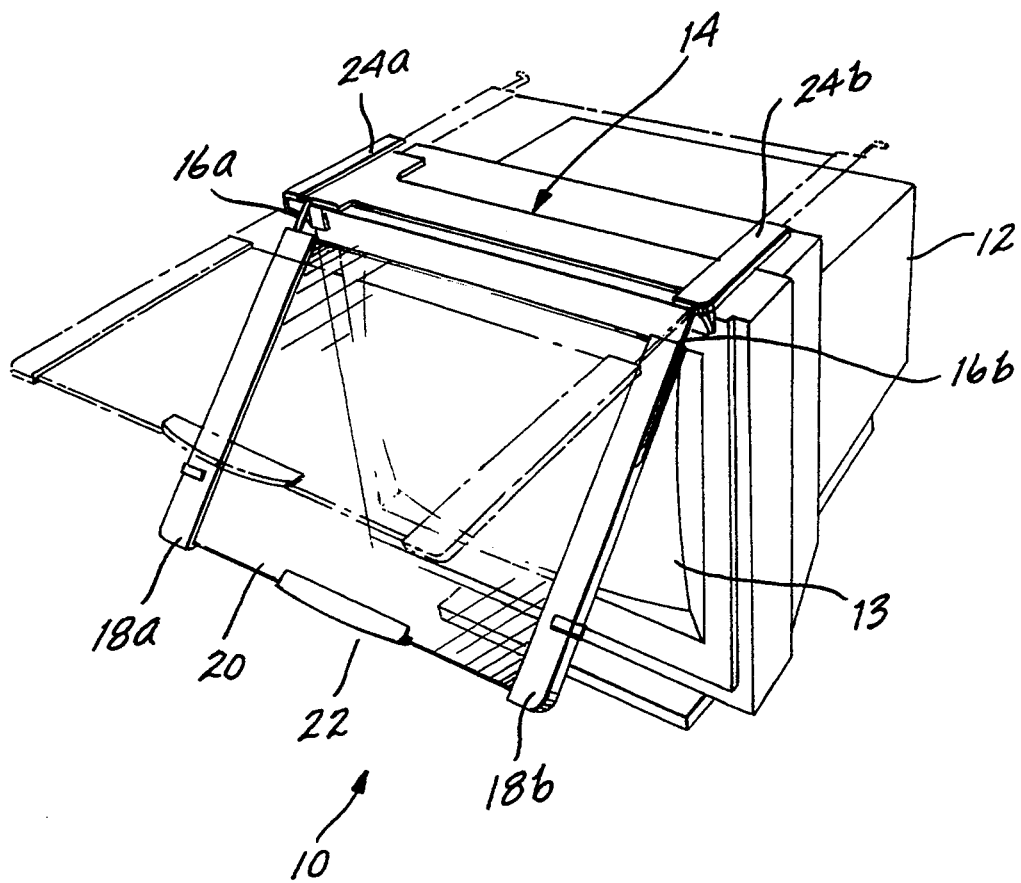
FIG. 6 is a perspective view showing the movement of the filter glass from above the monitor to a position over the face of the monitor.

FIGS. 4–6 illustrate the movement and positioning of filter glass 20 that is possible with glare filter 10. Specifically, the position of filter glass 20 along with lateral supports 18, rods 16 and handle 22 can be moved relative to top mount 14 and monitor 12. In a first position, illustrated in FIG. 4, filter glass 20 is positioned directly above monitor 12, out of the way of video display 13. In this position lateral supports 18 are simply held within lateral channels 28 of lateral guides 24. Rods 16 are not in contact with lateral guides 24. In this position, video display 13 may effectively and easily be cleaned or filter glass 20 may be pulled even further rearwardly to remove and clean filter glass 20 as explained below. This position may also be used to slide filter glass 20 out of the way for use in low-light situations. In these situations, glare may not be a problem. Also, in this position, glare filter 10 requires little extra space since it rests nearly flat against the top of monitor 12.

Note that bumpers 48 limit the rearward movement of lateral supports and, thus, filter glass 20 by coming into contact with the forward ends of lateral guides 24. As explained above, bumpers 48 are removably attached to lateral supports 18 and, therefore, can be removed to allow filter glass 20 to be further slid rearwardly. Thus, filter glass 20 can be completely detached from top mount 14 as required for cleaning and other purposes. Once reinstalled, bumpers 48 are simply snapped back into place within notches 50 to avoid accidental rearward detachment of filter glass 20 from top mount 14.

FIG. 5 illustrates forward sliding motion of filter glass 20 with lateral supports 18 slidably engaged within lateral guides 24. This position may be used to reduce or eliminate glare from overhead light sources, while still maintaining an uncovered video display 13 for generally low-light applications. This may be advantageous during evening hours or other times when overhead lights are relied upon. Thus, the glare from an overhead light can be reduced or eliminated without covering video display 13. This hood configuration will also help reduce dust accumulation on video display 13. Alternatively, this hood position may be an intermediate position as filter glass 20 is moved from a stowed position above monitor 12, as illustrated in FIG. 4, to a position over the face of video display 13, as illustrated in FIG. 1. In this position, as in that shown in FIG. 4, lateral guides 24 hold lateral supports 18, and thus filter glass 20, securely in place. Note that, in moving between the positions shown in FIGS. 4 and 5, glare filter 10 does not interfere with any objects over monitor 12 since the provision for sliding of filter glass 20 keeps it near monitor 12.

FIG. 6 illustrates the movement of filter glass 20 further outwardly and downwardly to cover video display 13. To carry out this movement, the user simply grasps handle 22 and continues to pull filter glass 20 outwardly in a direction parallel to the top surface of monitor 12 until lateral supports 18 are completely free of lateral guides 24 and rods 16 come to the forward ends of slots 38. In this position, filter glass 20 no longer can be forwardly extended but can be pivoted downwardly over the face of video display 13. Upward pivotal movement is restrained by lateral guides 24, in the preferred embodiment. Once pivoted downwardly, as shown in FIG. 6, glare filter 10 is in a position as shown in FIG. 1.

Referring to FIG. 7, the antistatic features of glare filter 10 will now be described. As discussed above, a very thin conductive layer is deposited beneath a surface coating on filter glass 20. This conductive layer is in contact with a thicker portion of conductive material, preferably indium, forming a small rectangular bus bar 40 at the lateral edge of filter glass 20 near the top. Copper or other conductive materials may alternatively be used. A bar clip 42 contacts bus bar 40. Bar clip 42 is a U-shaped metal clip that slides securely over the edge of filter glass 20 at the location of bus bar 40. The outer end of bar clip 42 projects slightly beyond the edge of filter glass 20 to come in contact with rod 16b. Alternatively, this arrangement could just as well be located on the left side of filter glass 20, in which case rod 16a would be used, and so on. The upper end of rod 16b contacts a channel clip 44. Channel clip 44 is a metallic clip held within the forwardmost end of slot 38b. The upper portion of channel clip 44 is C shaped to correspond to both the shape of the forwardmost end of slot 38b, but also the diameter of the upper end of rod 16b for positive electrical contact therewith. The lower portion of channel clip 44 is L shaped and extends downwardly to a location beneath lateral channel 28b.

A ground wire 46 extends within top mount 14, between two layers of top mount 14 from a rearward end of top mount 14, adjacent lateral guide 24b to the bottom leg of channel clip 44. Ground wire 46 is preferably soldered directly to the lower portion of channel clip 44. Ground wire 46 has sufficient length to extend from the rear of top mount 14 to a suitable ground, such as a screw on the back of a computer or a ground on monitor 12.

Electrostatic energy is thus dissipated by traveling through the conductive coating on filter glass 20 to bus bar 40, through bus bar 40, bar clip 42, rod 16b, channel clip 44, clip contact 48 to ground wire 46, which is connected to a suitable ground. This antistatic system eliminates harmful static. The dissipation of electrostatic energy also reduces buildup of dust.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A glare filter for use with a visual display terminal having a display screen and a back, the glare filter comprising:
    (a) a filter screen having rigid edges and being positionable over the display screen to reduce display screen glare;
    (b) a mount secured to the terminal;
    (c) a rigid coupler extending from said filter screen said coupler being attached to said filter screen so as to move with said filter screen as said filter screen is positioned over or away from the display screen, said coupler being pivotally and slidably attached to said mount to allow said filter screen to be moved from a position over the display screen to a position removed from the display screen, the pivotal attachment of said coupler being along an axis generally parallel to the display screen.

2. The glare filter of claim 1, wherein said mount includes a guide positioned to slidably receive said coupler, said guide having a length of at least one-fourth the height of said filter screen to permit said filter screen to be slid toward the back of the terminal a distance of at least one-fourth of the height of said filter screen.

3. The glare filter of claim 2, wherein said guide includes a channel within which an end of said coupler pivots to position said filter screen over the display screen of the glare filter and slides to position said filter screen adjacent the terminal away from the display screen, said coupler sliding with within said channel when pivoted away from the display screen.

4. The glare filter of claim 3, wherein said mount is secured to the top of the terminal, said channel extending in a direction generally transverse to the display screen, said channel receiving the sides of said filter screen after said filter screen is pivoted upwardly and slid rearwardly.

5. A glare filter for use with a visual display terminal having a display screen on its forward side, the glare filter comprising:
    (a) a filter screen having lateral edges, a top edge, and a bottom edge;
    (b) a mount secured to the terminal and including two lateral guides forming channels, the distance between said channels being slightly larger than the width of said filter screen to slidably receive the lateral edges of said filter screen, said channels being oriented generally transverse to the surface of the display screen such that said filter screen may be held above said terminal and above said display screen;
    (c) couplings extending from said filter screen and slidably and pivotally engageable within the channels of said lateral guides, said couplings being pivotally movable relative to said mount, when said filter screen is extended to a forwardmost position relative to said mount, to allow said filter screen to be pivoted downwardly to a position over said display screen.

6. The glare filter of claim 5, wherein said lateral edges of said filter screen include lateral supports, said couplings being connected to said lateral supports and said lateral supports being slidably engageable within the channels of said lateral guides.

7. The glare filter of claim 5, wherein said couplings include top ends, bottom ends, and outward projections at their top ends, and wherein said lateral guides include inner slots within said channels, said inner slots receiving said outward projections of said couplings, said inner slots terminating before the forwardmost ends of said lateral guides to limit forward sliding movement of said filter screen, said filter screen being pivotally movable in a downward direction about said outward projections when said filter screen is slid to a forwardmost position with said lateral edges forward of the channels of said lateral guides.

8. The glare filter of claim 7, wherein at least one of said couplings comprises an electrically conductive material, and wherein said coupling is in contact with one of said lateral edges of said filter screen and the upper end of said coupling is coupled to a grounding wire when said filter screen is in a lowered position covering the display screen.

9. The glare filter of claim 8, wherein said filter screen includes a conductive layer, said conductive layer being connected to said coupling at said one of said lateral edges of said filter screen.

10. The glare filter of claim 7, wherein said lateral edges of said filter screen include lateral supports, said couplings being connected to said lateral supports and said lateral supports being slidably engageable within the channels of said lateral guides, said lateral supports also including adjustment holes extending transversely into said lateral supports, and wherein the longitudinal axis of said couplings is parallel to the lateral edges of said filter screen, the bottom end of each of said couplings including an inward projection that removably mates with one of said adjustment holes for vertical adjustment of said filter screen.

11. The glare filter of claim 7, further including vertical adjustment means for adjusting the vertical position of said filter screen relative to said mount.

12. The glare filter of claim 5, wherein said filter screen comprises a low-transmission glass.

13. A glare filter for use with a visual display terminal having a display screen on its forward side, the glare filter comprising:
  (a) a filter screen having lateral edges, a top edge, and a bottom edge, said filter screen having a size to at least substantially cover the display screen;
  (b) a plurality of screen mount projections extending from said filter screen; and
  (c) mount means secured to the terminal for slidably engaging the lateral edges of said filter screen and for slidably and pivotally engaging said screen mount projections, said mount means allowing said filter screen to slide to a position wherein a portion of said filter screen is directly above the terminal, said filter screen being slidable to a position above the terminal after being pivoted away from the display screen.

14. The glare filter of claim 13, wherein said filter screen includes lateral supports along at least portions of its lateral sides, wherein said screen mount projections comprise rods attached to said lateral supports and extending upwardly therefrom, said rods being pivotally and slidably attached to said mount means.

15. The glare filter of claim 14, wherein said mount means comprise lateral guides having channels to slidably engage said lateral supports and slots to slidably and pivotally engage said rods, such that said filter screen may be moved from a position directly in front of the terminal to a hood position above the display screen to a lowered position over the face of the display screen.

16. The glare filter of claim 13, further comprising grounding means for grounding said filter screen when in position over the display screen.

* * * * *